(12) United States Patent
Lee et al.

(10) Patent No.: US 8,815,758 B2
(45) Date of Patent: Aug. 26, 2014

(54) SILICA-BASED NONFLAMMABLE MATERIAL FOR REPLACING ASBESTOS AND METHOD FOR PREPARING SAME

(75) Inventors: Se-Lin Lee, Seoul (KR); Jang Seop Oh, Seoul (KR)

(73) Assignee: Se-Lin Lee, Seoul (KR)

( * ) Notice: Subject to any disclaimer, the term of this patent is extended or adjusted under 35 U.S.C. 154(b) by 241 days.

(21) Appl. No.: 13/319,510

(22) PCT Filed: May 10, 2010

(86) PCT No.: PCT/KR2010/002950
§ 371 (c)(1),
(2), (4) Date: Dec. 2, 2011

(87) PCT Pub. No.: WO2010/128834
PCT Pub. Date: Nov. 11, 2010

(65) Prior Publication Data
US 2012/0080635 A1    Apr. 5, 2012

(30) Foreign Application Priority Data
May 8, 2009  (KR) .................. 10-2009-0040355

(51) Int. Cl.
*C03C 11/00*  (2006.01)
*C03C 3/078*  (2006.01)

(52) U.S. Cl.
USPC ............................................. 501/39; 501/72

(58) Field of Classification Search
USPC ................... 501/22, 33, 69, 70, 72
See application file for complete search history.

(56) References Cited

U.S. PATENT DOCUMENTS

| 5,091,345 A | * | 2/1992 | Becker | 501/14 |
| 5,559,170 A | * | 9/1996 | Castle | 523/223 |
| 5,641,717 A | * | 6/1997 | Castle | 501/33 |
| 5,883,029 A | * | 3/1999 | Castle | 501/33 |

FOREIGN PATENT DOCUMENTS

| KR | 10-1999-0084110 A | 12/1999 |
| KR | 20-0351515 Y1 | 6/2004 |
| KR | 10-2005-0094386 A | 9/2005 |
| KR | 10-2007-0001164 A | 1/2007 |
| KR | 20-0435418 Y1 | 1/2007 |
| KR | 10-2007-0065854 A | 6/2007 |

OTHER PUBLICATIONS

International Search Report dated Jan. 31, 2011 for International Application No. PCT/KR2010/002950.

* cited by examiner

*Primary Examiner* — Noah Wiese
(74) *Attorney, Agent, or Firm* — Knobbe, Martens, Olson & Bear, LLP

(57) ABSTRACT

The present application relates to a silica-based nonflammable material and to a method for preparing same. More particularly, the application relates to a silica-based nonflammable material which contains silica, limestone, and albite as main ingredients, which is obtained by a series of processes including grinding, melting, spraying, and molding, and which can replace asbestos, as well as to a method for preparing same. As functional building materials which are nonflammable even at high temperatures can be prepared using silica-based nonflammable materials consisting of silica-based minerals, and as only natural minerals may be used as main ingredients. The materials used as building materials may not be harmful to the human body and can replace asbestos that has been widely used as a conventional building material for thermal insulation, soundproofing, etc.

5 Claims, 2 Drawing Sheets

SILICA-BASED NONFLAMMABLE MATERIAL FOR REPLACING ASBESTOS AND METHOD FOR PREPARING SAME

TECHNICAL FIELD

The present invention relates to a silica-based nonflammable material and a method for preparing the same, and more particularly, to such a silica-based nonflammable material containing silica, limestone, and albite as main ingredients, which is obtained by a series of processes including grinding, melting, spraying, and molding, and which can replace asbestos, as well as to a method for preparing the same.

BACKGROUND ART

Asbestos is a hydrous silicate mineral which is fibrous in nature and is abundant in magnesium. It is has been widely used as a building material such as a millboard, an asbestos slate, or the like, a fireproof material, a refractory material, a thermal insulation material, an electrical insulating material, an electrolytic membrane material, a brake lining material, or the like.

In particular, asbestos is widely used as being excellent in heat resistance, insulation property, abrasion resistance, tensile strength, and resistance to acid or alkali chemical substances, and being very inexpensive. However, as it has been recently found that asbestos is carcinogenic, it is gradually thrown out. Furthermore, a research is in progress to replace asbestos.

Representative examples of the research result include Korean Utility Model Registration No. 20-0351515 disclosing a nonflammable sheet in which carbon fiber sheets are bonded to both surfaces of a silica fiber sheet by an adhesive, Korean Utility Model Registration No. 20-0435418 disclosing a construction grass (fiber) cement board in which a fiber obtained by pulping grasses or herbaceous plants is mixed with cement and water to thereby produce a thermal and sound insulation material which is used for interior and exterior construction and is resistant water and fire, and Korean Patent Laid-Open Publication No. 2007-0065854 disclosing a method for producing a sound-absorbing material using a recycling synthetic fiber waste and a sound-absorbing board for use in building.

The above-mentioned prior arts partially solve the harmfulness problem occurring in asbestos and have an additional function of a building material. However, such conventional prior arts still entail a drawback in that since they include raw materials from which a harmful substance can be released partially, the harmfulness problem is not solved completely.

Accordingly, the present inventors have made extensive efforts to solve the problems associated with the conventional prior arts and, as a result, have found that a nonflammable building material which are not harmful to the human body can be prepared by subjecting silica, limestone, and albite, or wollastonite and albite, which are natural minerals to a series of processes including grinding, melting, spraying, and molding, thereby completing the present invention.

DISCLOSURE OF INVENTION

Technical Problem

An object of the present invention is to provide a silica-based nonflammable material which can replace asbestos and a method for preparing the same.

Technical Solution

In order to achieve the above object, in one aspect, the present provides a method for preparing a silica-based nonflammable material, the method including the steps of:

(a) grinding natural minerals including silica, limestone, and albite as main ingredients into a natural mineral powder;

(b) melting the natural mineral powder including silica, limestone, and albite, which are ground in the step (a) to thereby form a liquid melt; and (c) spraying the liquid melt formed in the step (b) to thereby obtain the silica-based nonflammable material as a sprayed material.

In another aspect, the present invention provides a silica-based nonflammable material containing silica, limestone, and albite, which is prepared by the said method.

In still another aspect, the present invention provides a method for preparing a silica-based nonflammable material, the method including the steps of:

(a) grinding natural minerals including wollastonite and albite as main ingredients into a natural mineral powder;

(b) melting the natural mineral powder including wollastonite and albite, which are ground in the step (a) to thereby form a liquid melt; and (c) spraying the liquid melt formed in the step (b) to thereby obtain the silica-based nonflammable material as a sprayed material.

In yet another aspect, the present invention provides a silica-based nonflammable material containing wollastonite and albite, which is prepared by the said method.

Other features and embodiments of the present invention will be more apparent from the following detailed descriptions and the appended claims.

BRIEF DESCRIPTION OF THE DRAWINGS

FIG. 2 illustrates photographs of a silica-based nonflammable material containing silica, limestone, and albite, which is prepared according to the present invention, wherein FIG. 2(a) shows a silica-based nonflammable material after molding and FIG. 2(b) shows a silica-based nonflammable material before molding.

FIG. 3 illustrates photographs of a silica-based nonflammable material containing wollastonite and albite, which is prepared according to the present invention, wherein FIG. 3(a) shows a silica-based nonflammable material after molding and FIG. 3(b) shows a silica-based nonflammable material before molding.

BEST MODE FOR CARRYING OUT THE INVENTION

Unless defined otherwise, all technical and scientific terms used herein have the same meaning as commonly understood by one of ordinary skill in the art to which the invention pertains. Generally, the nomenclature used herein and the experiment methods which will be described later are those well known and commonly employed in the art.

Figure 1:
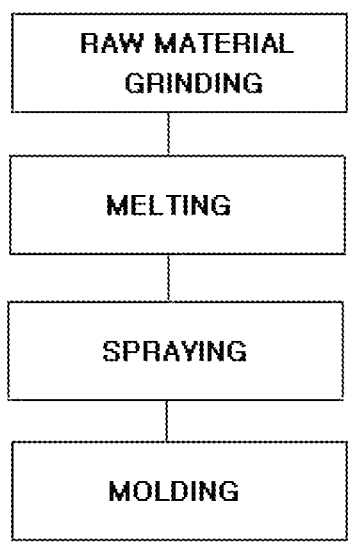
FIG. 1 is a flow chart illustrating a process for preparing a silica-based nonflammable material according to the present invention.

In one aspect, the present invention is directed to a method for preparing a silica-based nonflammable material, the method including the steps of: (a) grinding natural minerals including silica, limestone, and albite as main ingredients into a natural mineral powder; (b) melting the natural mineral powder including silica, limestone, and albite, which are ground in the step (a) to thereby form a liquid melt; and (c) spraying the liquid melt formed in the step (b) to thereby obtain the silica-based nonflammable material as a sprayed material. (see FIG. 1)

Silica sand is quartz sand which is high in the content of silicon dioxide ($SiO_2$). Specifically, silica sand refers to sand occurring by a natural phenomenon in which other mineral materials decompose to disappear, and only quartz remains or is transported due to weathering. The total estimated reserves of silica sand in Korea are about 109 million tones, and silica sand has been used as a variety of kinds of construction materials including concrete for a long time.

Thus, the present invention proposes a silica-based nonflammable material which is not harmful to the human body and contains silica and wollastonite as a sort of silica sand, i.e., a natural mineral easily available in Korea. In particular, since silica has a relatively high melting temperature of above 1400-1600° C., limestone and albite were used as main ingredients along with silica in order to lower the melting temperature of silica. Since wollastonite has a relatively low melting temperature of 600-800° C., only albite was used as main ingredients along with silica.

Silica is a mineral with the chemical formula $SiO_2$, usually in the form of quartz. Since silica has the physical properties of fire-proof, it is used as a main ingredient of refractory construction materials including refractory mortar, refractory brick, and the like, and has the properties of being melted at high temperature of 1400-1600° C.

Thus, in the present invention, silica functions to bestow the nonflammable properties to the silica-based nonflammable material prepared finally to make it possible to produce the functional building materials exhibiting nonflammability. Further, since silica is a naturally occurring mineral in the form of sandstone, and the like, it shows the effect of not releasing substances which is harmful to the human body.

Limestone is a mineral which possesses the physical properties of refractory and thermal insulation properties, soundproofness, lightweightness, formability, and the like. In addition, limestone contains $CaCO_3$ as a main ingredient and has the properties of being melted at a low temperature of 900-1100° C.

Thus, in the present invention, limestone acts to lower the melting temperature in the melting process, and can show the effect of reducing the cost spent to produce the silica-based nonflammable material.

Albite ($Na_2O.Al_2O_3.6SiO_2$) is a mineral which has the molecular weight of 524.3 and a melting point of 1000-1100° C. It has the physical properties of smoothly binding particles of a material to each other at relatively low temperature.

Thus, in the present invention, albite acts to binding the powder particles of silica as a main ingredient of the silica-based nonflammable material to each other by virtue of the aforementioned physical properties, which makes it possible to produce the silica-based nonflammable material at relatively low melting temperature, thereby reducing the production cost.

In the present invention, the limestone and the albite are contained in the amount of 60 to 90 parts by weight and 60 to parts by weight, respectively, based on 100 parts by weight of silica.

If the content of the limestone is less than 60 parts by weight based on 100 parts by weight of silica, a problem occurs in which the melting temperature is still high. On the contrary, if the content of the limestone exceeds 90 parts by weight based on 100 parts by weight of silica, there will be no advantage according to an increase in the amount of limestone added. Further, if the content of the albite is less than 60 parts by weight based on 100 parts by weight of silica, a problem occurs in which the melting temperature is still high. On the contrary, if the content of the albite exceeds 90 parts by weight based on 100 parts by weight of silica, there will be no advantage according to an increase in the amount of albite added.

In the present invention, preferably, silica and albite used as main ingredients are ground into a natural mineral powder having a particle size of 1-3 mm. Much time is spent to grind silica and albite into a natural mineral powder having a particle size of less than 1 mm. If the particle size of the natural mineral powder exceeds 3 mm, there occurs a problem in that much time is required to melt the natural mineral powder. The silica, the limestone and the albite may be ground, respectively, and then melted together. Alternatively, the limestone and the albite may be ground and then melted together.

In the present invention, the melting in the step (b) is performed at 700-1,300° C. for 20 to 50 minutes. If the melting temperature of the natural mineral powder is less than 700° C., the melting will not be sufficiently performed. Contrarily, if the melting temperature exceeds 1,300° C., there will be no advantage according to an increase in the melting temperature. In addition, if the melting time of the natural mineral powder is less than 20 minutes, the melting will not be sufficiently performed. Contrarily, if the melting time exceeds 50 minutes, there will be no advantage according to an increase in the melting time.

The melting is preferably performed in a kiln as an apparatus used to conduct a general heat treatment process including melting, calcinations, and the like, but is not limited thereto and any apparatus which can melt the natural mineral powder is possible.

In the present invention, the spaying in the step (c) may be performed by a high-pressure sprayer, and the sprayed material is a material in the form of cotton fiber.

In the present invention, a step of molding the material sprayed in the step (c) is additionally performed. The molding is an extrusion molding process.

The silica-based nonflammable material obtained as the sprayed material in the step (c) is in the form of cotton fiber. Application of the step of additionally molding the silica-based nonflammable material like cotton fiber can obtain a silica-based nonflammable material in the form of a panel.

As a specific example, an extrusion molding process using rollers will be described hereinafter.

The liquid melt formed through the melting process in the kiln is spayed onto the roller and the sprayed material in the form of cotton fiber is extruded while passing between a pair of rollers, so that a panel-like silica-based nonflammable material is wound on the rollers, thereby obtaining the silica-based nonflammable material in the form of a roll. In the case where the silica-based nonflammable material is actually used as building materials, it may be cut and used, if necessary.

In the meantime, the liquid melt may be sprayed onto the rollers together with an organic binder in order to further facilitate the molding in the extrusion molding process using the rollers.

In addition, in order to prevent the rolls of the panel-like silica-based nonflammable material extruded while passing between the rollers and wound on the rollers from sticking to each other, poly resins, resins, or the like may be placed on the bottom to form the rolls.

In another aspect, the present invention is also directed to a silica-based nonflammable material containing silica, limestone, and albite, which is prepared by the said method.

As described above, the silica-based nonflammable material in the form of cotton fiber, which contains silica, limestone, and albite as main ingredients, can be obtained by a series of processes including grinding, melting, and spraying. In addition, the silica-based nonflammable material in the form of a panel can be obtained by a series of processes including grinding, melting, spraying, and molding.

In still another aspect, the present invention is also directed to a method for preparing a silica-based nonflammable material, the method including the steps of: (a) grinding natural minerals including wollastonite and albite as main ingredients into a natural mineral powder; (b) melting the natural mineral powder including wollastonite and albite, which are ground in the step (a) to thereby form a liquid melt; and (c) spraying the liquid melt formed in the step (b) to thereby obtain a silica-based nonflammable material.

Wollastonite is a calcium inosilicate mineral with the molecular formula $CaSiO_3$, which contains 48.3% by weight of CaO and 51.7% by weight of $SiO_2$. In addition, wollastonite is a naturally occurring mineral, which shows the characteristics of maintaining nonflammability even at high temperature of above 1000° C.

Thus, in the present invention, wollastonite acts to bestow the nonflammable properties to the silica-based nonflammable material prepared finally to make it possible to produce the functional building materials exhibiting nonflammability. Further, since wollastonite is a naturally occurring mineral, it shows the effect of not releasing substances which is harmful to the human body.

In the present invention, the albite is contained in an amount of 10 to 50 parts by weight based on 100 parts by weight of the wollastonite.

If the content of the albite is less than 10 parts by weight based on 100 parts by weight of wollastonite, a problem occurs in which the melting temperature of the natural mineral powder is still high. On the contrary, if the content of the albite exceeds 50 parts by weight based on 100 parts by weight of wollastonite, there will be no advantage according to an increase in the amount of albite added.

In the present invention, the melting in the step (b) is performed at 700-800° C. for 20 to 50 minutes. If the melting temperature of the natural mineral powder is less than 700° C., the melting will not be sufficiently performed. Contrarily, if the melting temperature exceeds 800° C., there will be no advantage according to an increase in the melting temperature. In addition, if the melting time of the natural mineral powder is less than 20 minutes, the melting will not be sufficiently performed. Contrarily, if the melting time exceeds 50 minutes, there will be no advantage according to an increase in the melting time.

In the present invention, a step of molding the material sprayed in the step (c) is additionally performed.

In the present invention, the molding is an extrusion molding process using rollers.

In yet another aspect, the present invention is also directed to a silica-based nonflammable material containing wollastonite and albite, which is prepared by the said method.

Since the silica-based nonflammable material according to the present invention is obtained in the form of the cotton fiber or the panel, it can be properly used as a building material for thermal insulation, soundproofing, etc. in an arbitrarily selective manner in an actual building construction. Moreover, the inventive silica-based nonflammable material is not harmful to the human body as containing natural minerals as main ingredients, unlike asbestos which has been widely used as a building material but is found as having its harmfulness such as release of carcinogenic substances.

EXAMPLES

Hereinafter, the present invention will be described in further detail with reference to examples. It will be obvious to those skilled in the art that these examples are illustrative purposes only and are not to be construed to limit the scope of the present invention.

Example 1

Preparation of Silica-Based Nonflammable Material Containing Silica, Limestone, and Albite 40 kg of silica, 30 kg of limestone, and 30 kg of albite were ground into a natural mineral powder having a particle size of 1-3 mm using a ball mill (Korean Ceramic Co., Ltd.). The ground powder was charged into a kiln and was melted at 1100° C. for 35 minutes.

Figure 2:
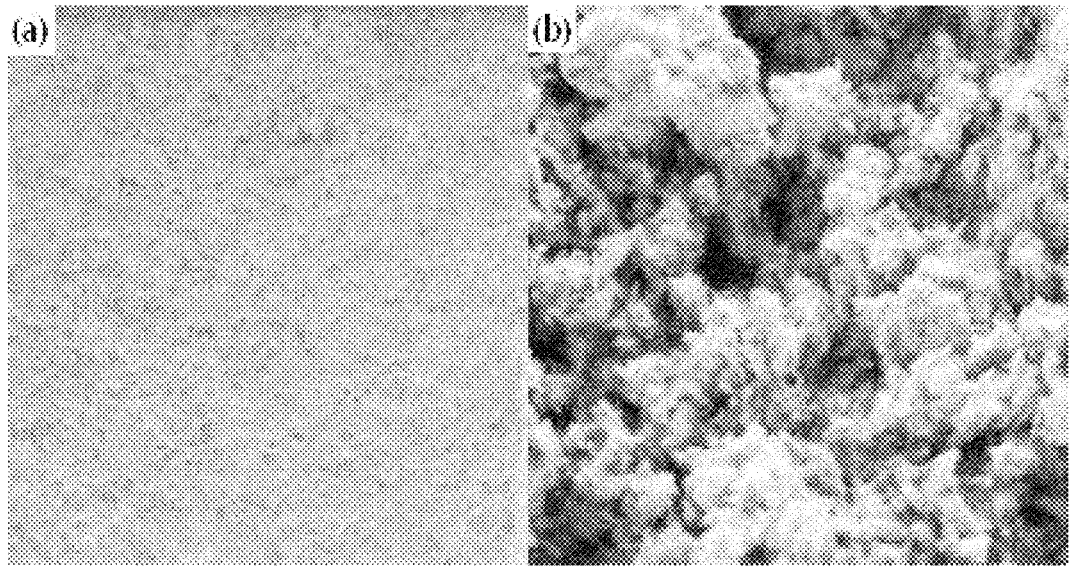

A liquid melt melted in and flowing out of the kiln was sprayed using a high pressure air compressor (Korean Dong-A Precision Co., Ltd) to obtain a silica-based nonflammable material in the form of cotton fiber (see FIG. 2(b)).

In addition, the silica-based nonflammable material as the sprayed material in the form of cotton fiber was extrusion-molded while passing between a pair of rollers (Korean Ceramic Co., Ltd.) and then was wound on the rollers to thereby obtain a silica-based nonflammable material in the form of a panel (see FIG. 2(a)).

Example 2

Preparation of Silica-Based Nonflammable Material Containing Wollastonite and Albite 70 kg of wollastonite and 30 kg of albite were ground into a natural mineral powder having a particle size of 1-3 mm using a ball mill (Korean Ceramic Co., Ltd.). The ground powder was charged into a kiln and was melted at 650° C. for 35 minutes.

Figure 3:
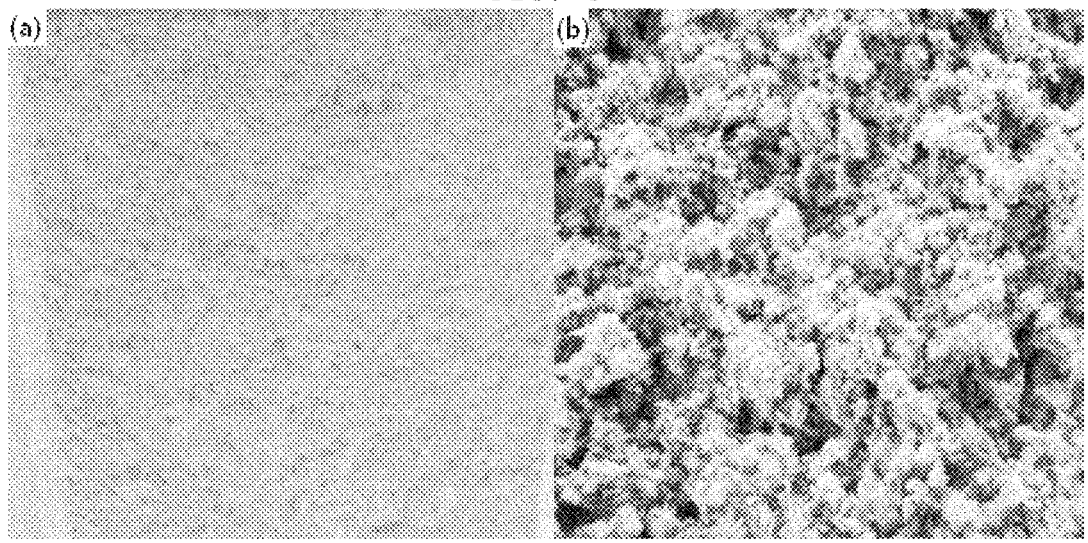

A liquid melt melted in and flowing out of the kiln was sprayed using a high pressure air compressor (Korean Dong-A Precision Co., Ltd) to obtain a silica-based nonflammable material in the form of cotton fiber (see FIG. 3(b)).

In addition, the silica-based nonflammable material as the sprayed material in the form of cotton fiber was extrusion-molded while passing between a pair of rollers (Korean Ceramic Co., Ltd.) and then was wound on the rollers to thereby obtain a silica-based nonflammable material in the form of a panel (see FIG. 3(a)).

INDUSTRIAL APPLICABILITY

As described above, According to the present invention, since functional building materials which are nonflammable even at high temperatures can be prepared using a silica-based nonflammable material consisting of silica-based minerals and only natural minerals are used as main ingredients, the silica-based nonflammable material can be used as a building material which is not harmful to the human body and which can replace asbestos that has been widely used as a conventional building material for thermal insulation, soundproofing, etc.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of preparing a silica-based nonflammable material, the method comprising:
    (a) grinding natural minerals comprising wollastonite and albite into natural mineral powder;
    (b) melting the natural mineral powder at a temperature between 700 and 800° C. for 20 to 50 minutes to provide a liquid melt; and
    (c) spraying the liquid melt to obtain a silica-based nonflammable material.

2. The method of claim 1, wherein the albite is contained in an amount of 10 to 50 parts by weight based on 100 parts by weight of the wollastonite.

3. The method of claim 1, further comprising molding the silica-based nonflammable material into a shape.

4. A silica-based nonflammable material prepared according to claim 1.

5. The silica-based nonflammable material of claim 4, wherein in the natural materials for grinding, the albite is contained in an amount of 10 to 50 parts by weight based on 100 parts by weight of the wollastonite.

* * * * *

UNITED STATES PATENT AND TRADEMARK OFFICE
CERTIFICATE OF CORRECTION

| | | |
|---|---|---|
| PATENT NO. | : 8,815,758 B2 | Page 1 of 1 |
| APPLICATION NO. | : 13/319510 | |
| DATED | : August 26, 2014 | |
| INVENTOR(S) | : Se-Lin Lee and Jang Seop Oh | |

It is certified that error appears in the above-identified patent and that said Letters Patent is hereby corrected as shown below:

In the Specification

1. At Column 3, Line 4, change "(See FIG. 1)" to --See FIG. 1.--.
2. At Column 3, Line 59 (Approx.), before "parts" insert --90--.
3. At Column 4, Line 48 (Approx.), change "spayed" to --sprayed--.

In the Claims

4. At Column 7, Line 22 (Approx.), Claim 5, change "wherein" to --wherein,--.

Signed and Sealed this
First Day of September, 2015

Michelle K. Lee
*Director of the United States Patent and Trademark Office*